United States Patent [19]

Barnes, Jr. et al.

[11] Patent Number: 5,679,025
[45] Date of Patent: Oct. 21, 1997

[54] FRONT REMOVABLE INSERT

[75] Inventors: Richard Lewis Barnes, Jr., Unadilla; John Henry Mikolaicyk, Oneonta; Gregory John Oleksik, Otego; David Otis Gallusser, Oneonta, all of N.Y.

[73] Assignee: Amphenol Corporation, Wallingford, Conn.

[21] Appl. No.: 526,286

[22] Filed: Sep. 11, 1995

[51] Int. Cl.⁶ .................................................. H01R 13/40
[52] U.S. Cl. ...................................... 439/598; 385/72
[58] Field of Search .................................. 439/654, 598, 439/589, 599; 385/81, 87, 72

[56] References Cited

U.S. PATENT DOCUMENTS

| | | | |
|---|---|---|---|
| 1,034,910 | 8/1912 | Greenway | 439/906 |
| 4,155,159 | 5/1979 | Hogan et al. | 29/764 |
| 5,101,463 | 3/1992 | Cobokciyan et al. | 385/87 |
| 5,129,023 | 7/1992 | Anderson et al. | 385/72 |
| 5,265,182 | 11/1993 | Hartley et al. | 385/77 |
| 5,386,486 | 1/1995 | Fan et al. | 385/59 |
| 5,548,674 | 8/1996 | Rondeau | 385/81 |
| 5,588,080 | 12/1996 | Kawamura | 385/72 |

*Primary Examiner*—Gary F. Paumen
*Assistant Examiner*—Christopher Goins
*Attorney, Agent, or Firm*—Bacon & Thomas

[57] ABSTRACT

A front connector insert includes a removable front portion and a rear portion which is fixed in the connector. The rear portion retains the terminus of an optical fiber or electrical cable, with the removable front portion being removable to expose the terminus for cleaning or testing. The removable front portion includes a latching clip having a detent at one end which engages an indentation in the fixed portion of the insert when the removable portion of the insert is aligned with the fixed portion such that the clips align with grooves in the fixed insert. Removal of the removable portion of the insert is accomplished using a simple removal tool having an L-shaped extension which is inserted into a corresponding L-shaped recess in the front insert, the removal tool being rotated following insertion so that the removable insert can easily be removed from the connector to expose the optical fiber termini and contacts and permit testing or cleaning. In the case of an optical fiber connector, alignment sleeves and/or tubes may be captured within the removable front portion of the insert so as to prevent loss of the alignment tubes or sleeves upon removal of the removable insert from the connector.

12 Claims, 2 Drawing Sheets

FRONT REMOVABLE INSERT

BACKGROUND OF THE INVENTION

1. Field of the Invention

This invention relates to the field of cable connectors and, in particular, to a removable insert for a cable connector. The removable insert of the invention is particularly suitable for use in fiber optic connectors, although it may also be useful in electrical connectors.

2. Description of Related Art

The problem addressed by the present invention is the problem of accessing the optical fiber termini or electrical contacts of the socket portion of a connector, in which the optical fiber termini or electrical contacts are recessed and therefore difficult to access for cleaning or visual inspection following termination of the fiber optic or electrical cable or cables to the connector. The solution involves dividing the front insert, which holds optical fiber alignment sleeves or electrical contacts, into a terminus or contact retaining portion and a removable portion. When the removable portion is disassembled from the connector with the entrapped alignment sleeves, the fiber tips, or electrical contact tips, are exposed for cleaning or testing. While the broad concept of dividing the front insert into a fixed and removable portion has previously been proposed, as will be discussed in more detail below, the present invention provides a simpler mechanism for coupling the removable and fixed portions of the insert.

In multi-channel connectors, there is usually a plurality of pin termini on one side of the mated connector pair and a plurality of socket termini on the other side of the mated connector pair. The pin termini typically protrude from the pin insert which contains the plurality of pin termini and are therefore relatively easy to access for cleaning or inspection without any special treatment, but the socket termini are typically recessed within the socket insert.

This can cause significant performance problems in fiber optic connectors because the recessing of the termini makes it difficult to access the end faces of the fibers in the termini for cleaning, with even the smallest particles having the potential to significantly degrade the signal and thus introduce unacceptable losses to signal transmission. In addition, in both fiber optic and electrical connectors, certain inspections of the fibers or contacts must be carried out prior to assembly due to difficulties in accessing the fibers and contacts and, while cleaning of electrical contacts is less critical in general than is the case for optical fibers, periodic access for inspection and cleaning may nevertheless be desirable for certain applications, especially in extremely dirty or polluted environments.

As indicated above, the problem of accessing fiber optic cable termini or electrical contacts in recessed portions of a socket insert hay previously been addressed. in U.S. Pat. Nos; 5,386,486 and 5,265,182, both of which disclose the concept of making a portion of the insert in which the cable termini or contacts are located removable to expose the optical fiber end faces and termini or contacts for cleaning. However, in one of the two prior arrangements, assembly of the removable portion of the insert to the fixed portion is inconvenient, and in the other the coupling mechanism is relatively complicated. Since the connectors in question have applications where large numbers of cables must be inspected and cleaned relatively frequently, the disadvantages of complexity, either in the assembly process or in the mechanism itself, can be significant.

U.S. Pat. No. 5,386,486, for example, accomplishes the desired access to optical fiber termini or electrical contacts by providing separate inserts for the alignment tube (or bushing) 42 and for the termini, with the alignment sleeve insert 44 being removably secured to the insert containing the cable termini by a spring biased quarter turn latch or "locking pin" 48 operated by a screwdriver. As a result, assembly of the insert to the connector requires the steps of both aligning the insert and connector, via pins 69, inserting the insert into the connector such that the alignment sleeves or ferrules enter the alignment tubes, and then turning the quarter latch to secure the insert in the connector. The extra time and coordination required to accomplish insertion of the insert into the connector, while probably minimal for cleaning of a single connector, can be extremely significant where multiple cables are need to be cleaned and time is at a premium, such as for maintenance of equipment involving multiple cables under battle field conditions. Also, the spring biased quarter turn latch adds to the cost of the insert assembly.

The arrangement described in U.S. Pat. No. 5,265,182, in contrast, can be inserted and latched in a single motion, thus saving assembly steps, but requires a relatively complex latch and plunger arrangement, including a spring clip 100 attached to a spring biased pin on a fixed insert 44, and a plunger release mechanism in the removable insert. Like the arrangement described in U.S. Pat. No. 5,386,486, the removable insert of this embodiment encompasses the alignment tubes, which are removed with the insert.

Accordingly, a need exists for an improved removable insert mechanism for a connector in which the insert can easily be inserted into the connector by simply aligning the insert with the connector and pushing the insert into the connector, and yet which is simple in structure and highly reliable.

SUMMARY OF THE INVENTION

It is accordingly an objective of the invention to provide an improved front insert for a cable connector of the type in which the front insert is arranged to retain optical fiber termini or electrical contacts within recessed openings at the front of the connector, and yet which permits access to the optical fiber termini or electrical contacts for cleaning or inspection, the improvement being in the form of a mechanism for reliably coupling the removable portion of the front insert to a fixed portion of the front insert having an especially simple construction and which permit the user to assemble the portion of the front insert to the fixed portion simply by aligning and linearly inserting the removable portion into the connector.

These objectives are achieved, in accordance with the principles of a preferred embodiment of the invention, by providing the removable front portion of the optical fiber termini or electrical contact retaining insert with a latching clip having a detent at one end which engages an indentation in the fixed, optical fiber termini or contact retaining portion of the front insert when the removable portion of the insert is aligned with the fixed portion of the insert such that the clips align with grooves in the fixed insert. Removal of the removable portion of the insert is accomplished using a simple removal tool having hooks which inserted into recesses in the front insert, the removal tool being rotated following insertion so that the removable insert can easily be removed from the connector to expose the optical fiber termini and contacts and permit testing or cleaning.

In an especially preferred embodiment of the invention, the removable front portion of the insert serves to retain the alignment members which permit ferrules attached to both of the fibers to be aligned within the insert, so as to completely expose the ends of the fiber termini for cleaning or inspection while avoiding lost retaining sleeves or tubes.

Those skilled in the art will appreciate that while the preferred embodiment of the invention is described primarily in terms of optical fiber connectors, the principles involved may also be useful in certain types of electrical connectors, in the which the optical fiber termini are replaced by electrical wires and contacts, as well as in combination fiber/electric connectors.

Further features and advantages of the invention will become apparent from the following description of a preferred embodiment of the invention although it will be appreciated by those skilled in the art that variations and modifications of the specific embodiment disclosed could be made without departing from the spirit and scope of the invention.

DETAILED DESCRIPTION OF THE PREFERRED EMBODIMENTS

Figure 1:
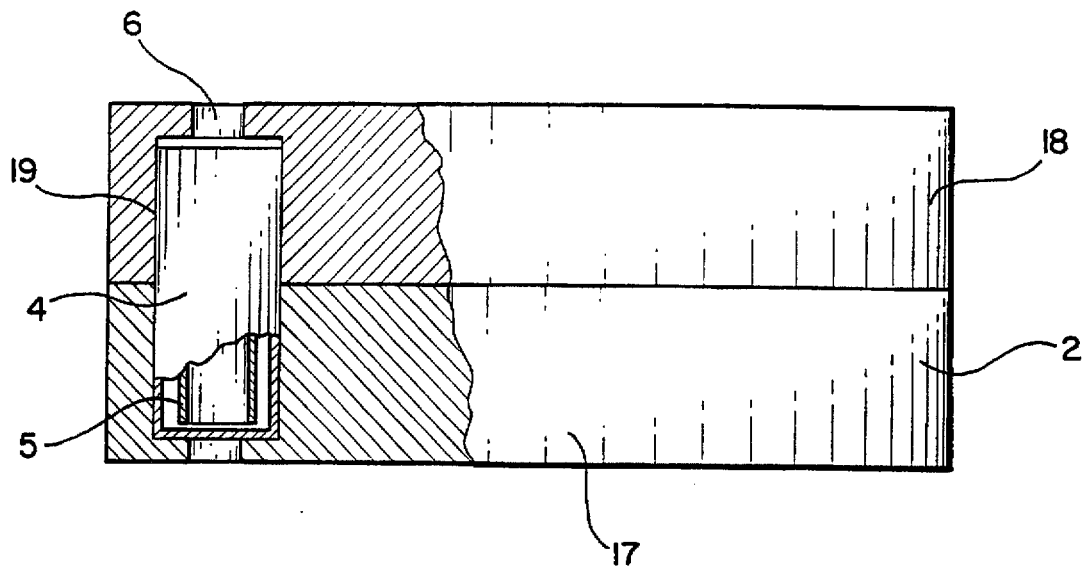
FIG. 1 is a partially cross-sectional side view of a front insert for a multiple cable fiber optic connector constructed in accordance with the principles of a preferred embodiment of the invention.
Figure 2:
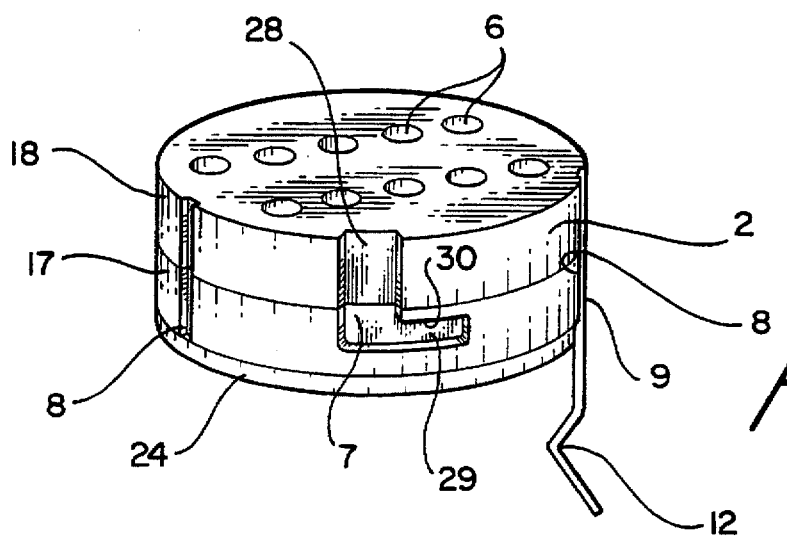
FIG. 2 is a perspective view of a removable portion of the front insert shown in FIG. 1, including one half of a preferred coupling mechanism, in the form of clips.
Figure 3:
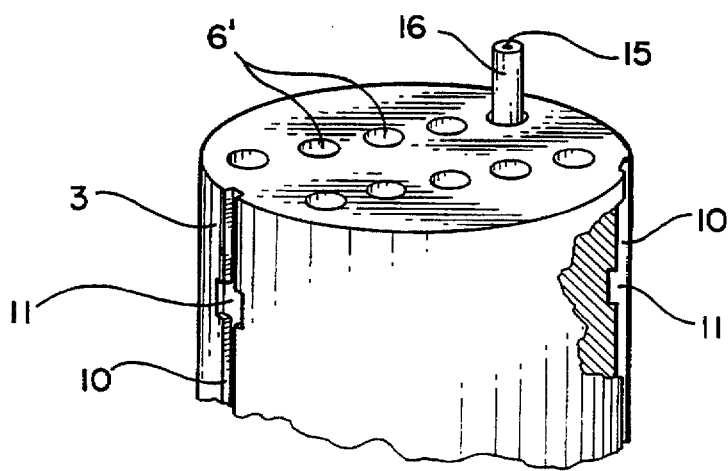
FIG. 3 is a perspective view of a fixed portion of the front insert shown in FIG. 1, including the second half of the preferred coupling mechanism, in the form of grooves and an indentation.

As illustrated in FIGS. 1–3, the preferred two part front insert assembly 1 includes generally cylindrical front and rear insert portions 2 and 3, each containing at least one opening 6,6' for receiving an optical or electrical cable to be terminated in the connector.

As illustrated, the insert 2 is arranged to accommodate a fiber optic cable (not shown), and includes both an alignment tube 4 and an alignment sleeve 5 of known construction. It will be appreciated by those skilled in the art that details of the alignment tube and/or alignment sleeve may be varied depending on the type of cable to be terminated, and that either the alignment tube or sleeve may be deleted as required.

Figure 4:
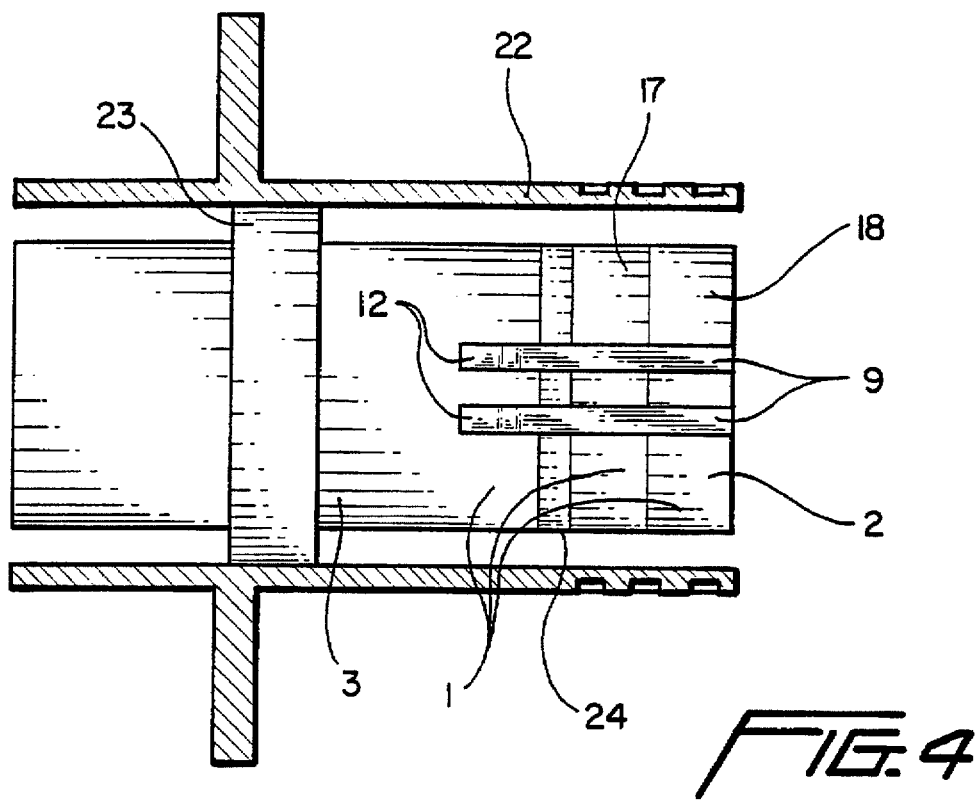
FIG. 4 is a partially cross-sectional side view of a connector which includes the front insert of FIGS. 1–3, with coupling clips.

In the illustrated embodiment, the removable portion 2 of the insert 1 includes an L-shaped recess 7 for accommodating an insert removal tool 20 (illustrated in FIG. 5) and a plurality of grooves 8, one of which is illustrated in FIG. 2 as having a clip 9 made of a resilient material installed therein, and the other of which is illustrated prior to installation of the clip, with two of the grooves 8 being illustrated in FIG. 4 as including clips 9.

Similarly, the fixed portion 3 of the insert 1 includes grooves 10 having indentations 11 formed therein to receive a detent portion 12 of the clips 9. Detent portion 12 may be in the form of an angled portion of the clips or a discrete member, but it is preferred that the clips in fact be formed in one piece, for example a stamped and formed leaf spring member. Openings 6' of the fixed insert portion 3 are arranged to accommodate and retain the termini for optical fibers 15, which in the illustrated embodiment are in the form of ferrules 16 arranged to fit within alignment sleeves 5 when the removable portion 2 of the insert 1 is assembled to the fixed portion 3.

Preferably, the grooves 8 are asymmetrically arranged around the periphery of the insert so as to form an alignment key in order to ensure that the openings 6 and 6' of the respective insert portions are aligned upon assembly. Those skilled in the art will of course appreciate that the number of grooves may be varied, with four being a typical number, and that the clips may be installed in the grooves 8 of the removable insert by any suitable method, such as staking, the grooves also being formed by any suitable method, such as machining.

In addition, it will be appreciated that the clips may alternatively be affixed to the fixed portion 3 of the insert 1, rather than to the removable portion 2, and that any of ferrules 16 could be replaced by electrical contacts with corresponding modifications to the removable front insert portion 2.

In an especially preferred embodiment of the invention, as shown in FIG. 1, the alignment tubes and/or sleeves 4 and 5 are captured within the removable front insert portion 2 by forming the removable front insert portion 2 in two parts 17 and 18 and permanently or removably affixing the two parts 17 and 18 together after capturing the alignment tube and sleeve in a recess 19 formed when the two parts are affixed to each other. As a result, the alignment tubes and sleeve can be retained and loss thereof avoided when the removable insert is removed from the connector.

In operation, as those skilled in the art will appreciate, the detented portions of the clips cause the clips to be pushed outwardly as the clips enter the grooves from the front during assembly of the front portion to the rear portion, with the restoring force provided by the resilience of the clips causing the detents to enter the indented sections and thereby secure the front portion of the insert to the rear portion.

Finally, as illustrated in FIG. 4, the fixed portion 3 of the insert 1 is secured to the connector shell 22 by any suitable means, such as staking of a section 23 of the insert portion 3 directly to the connector shell 22, and a gasket 24 may be attached to either the fixed or removable portions of the insert 1, together with appropriate o-rings or the like (not shown) for sealing the space between the insert and the connector shell.

Figure 5:
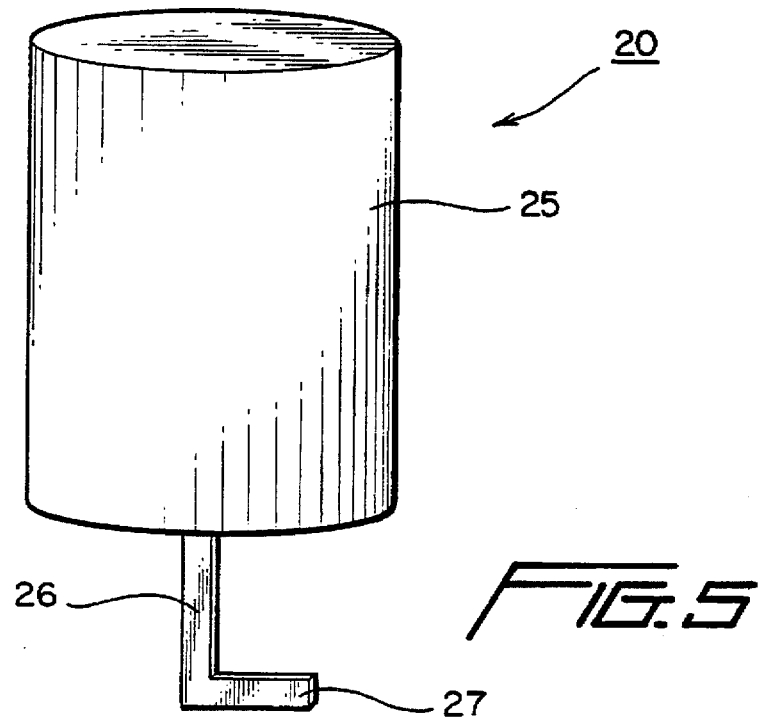
FIG. 5 is a perspective view of a removal tool for the removable portion of the front insert shown in FIGS. 1–4.

As illustrated in FIG. 5, the removal tool 20 preferably is made up of a main body or handle 25, and at least one L-shaped projection made up of a first section 26 extending transversely from the main body 25 and a section 27 transverse to the first section which has a length less than the width of a first portion 28 of recess 7 so as to be capable of being inserted therethrough, and which upon rotation of the main body enters the transverse second portion 29 of the recess 7 to engage the forward edge 30 of the section 29 and thereby permit the removable front insert portion 2 to be disassembled from the fixed rear insert portion 3 and removed from the connector to expose the optical fiber termini or electrical contacts retained in the fixed rear insert portion 3.

While in the illustrated embodiment, only one L-shaped extension is illustrated, those skilled in the art will appreciate that two such extensions could be used, and that the extensions and corresponding grooves in the removable front insert could have shapes other than an L-shape, including for example various hook and slot arrangements.

Having thus described a preferred embodiment of the invention, however, the inventors recognize that numerous variations of the preferred embodiment will undoubtedly occur to those skilled in the art, and intend that the invention be defined to include all such variations including, for example, the use of removal tools other than the illustrated removal tool, variations in the shape and construction of the clips used to couple the removable and fixed insert portions, application of the invention to rectangular rather than circular profile connectors, and application of the invention single rather than multiple cable connectors.

Consequently, it is intended that the invention not be limited to the preferred embodiment described herein and illustrated in the drawings but rather that it be limited solely by the appended claims.

We claim:

1. In a connector insert made up of a removable front insert portion and a rear insert portion affixed to a connector shell, said rear insert portion being arranged to retain at least one cable termination member, said termination member being exposed for cleaning or inspection when the removable front insert portion is removed from the connector, the improvement comprising at least one discrete clip having a detent attached to one of the two insert portions of the insert and a groove and indentation formed in the other of the two insert portions, the detent being arranged to engage the indentation when the clip is inserted into the groove to couple the front and rear insert portions of the insert, whereby the front and rear insert portions can be assembled together simply by aligning the clip and groove and inserting the clip into the groove until the detent engages the indentation.

2. A connector insert as claimed in claim 1, wherein the at least one cable termination member is an optical fiber terminus.

3. A connector insert as claimed in claim 2, wherein the removable front insert portion has sealed therein an optical fiber alignment sleeve.

4. A connector insert as claimed in claim 1, wherein the removable front insert portion includes means for receiving a removable insert portion removal tool.

5. A connector insert as claimed in claim 4, wherein the receiving means comprises an L-shaped recess in a periphery of the removable insert portion arranged to receive a corresponding L-shaped extension of the removal tool.

6. A connector insert as claimed in claim 1, wherein a number of said clips is at least two, the clips serving to provide a key to prevent mis-alignment of the removable front insert and the fixed rear insert upon assembly together.

7. In a connector which includes an insert made up of a removable front insert portion and a rear insert portion affixed to a connector shell, said rear insert portion being arranged to retain at least one cable termination member, said termination member being exposed for cleaning or inspection when the removable front insert portion is removed from the connector, the improvement comprising at least one discrete clip having a detent attached to one of the two insert portions of the insert and a groove and indentation formed in the other of the two insert portions, the detent being arranged to engage the indentation when the clip is inserted into the groove to couple the front and rear insert portions of the insert, whereby the front and rear insert portions can be assembled together simply by aligning the clip and groove and inserting the clip into the groove until the detent engages the indentation.

8. A connector as claimed in claim 7, wherein at least one cable termination member is an optical fiber terminus.

9. A connector as claimed in claim 8, wherein the removable front insert portion has sealed therein an optical fiber alignment sleeve.

10. A connector as claimed in claim 7, wherein the removable front insert portion includes means for receiving a removable insert portion removal tool.

11. A connector as claimed in claim 10, wherein the receiving means comprises an L-shaped recess in a periphery of the removable insert portion arranged to receive a corresponding L-shaped extension of the removal tool.

12. A connector as claimed in claim 7, wherein said connector is a multiple cable connector.

* * * * *